July 6, 1954  E. C. MILLIKEN  2,682,696
METHOD FOR DRYING CLAY PIPE
Filed Aug. 28, 1951  2 Sheets-Sheet 1
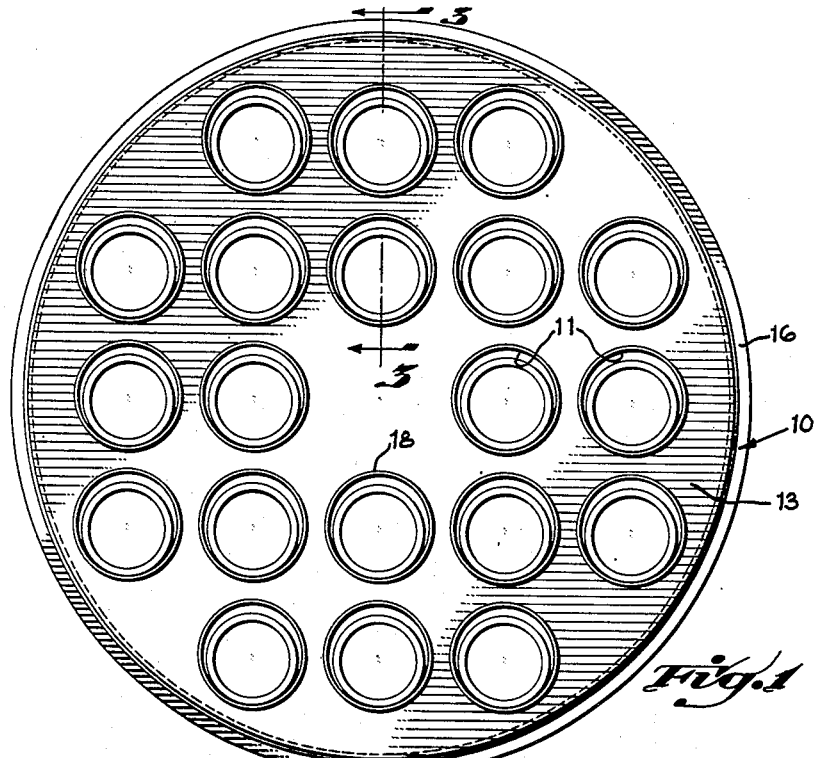
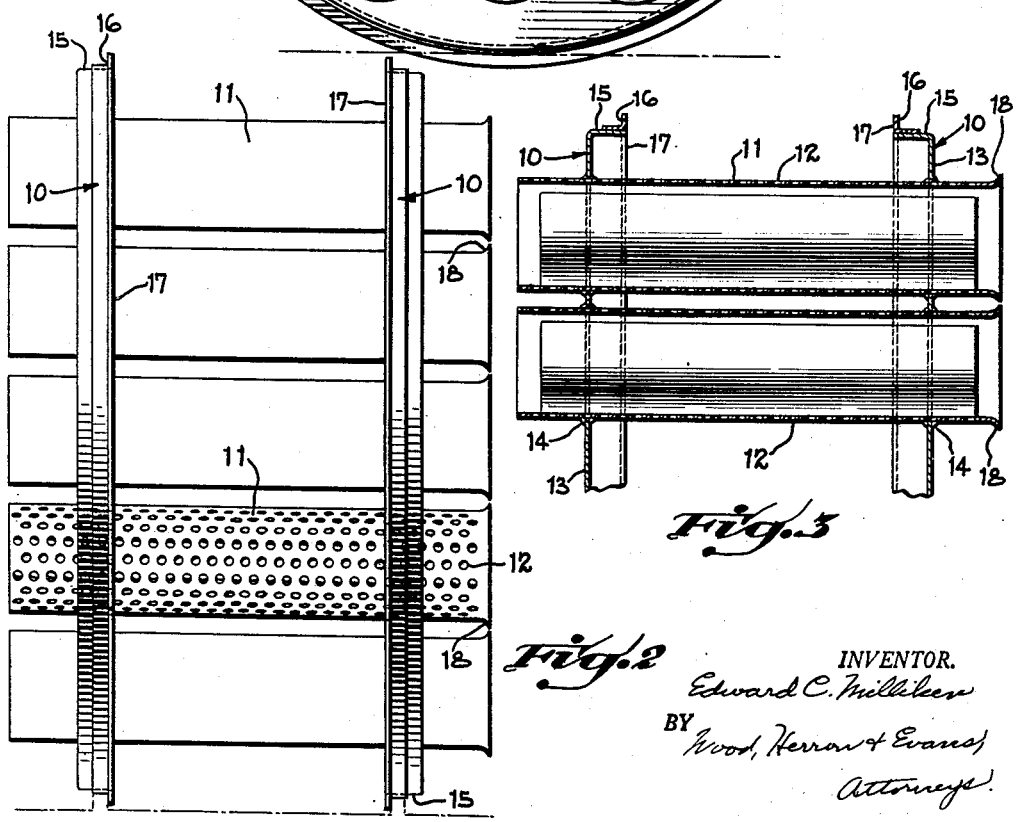
INVENTOR.
Edward C. Milliken
BY Wood, Herron & Evans
Attorneys July 6, 1954 E. C. MILLIKEN 2,682,696
METHOD FOR DRYING CLAY PIPE
Filed Aug. 28, 1951 2 Sheets-Sheet 2
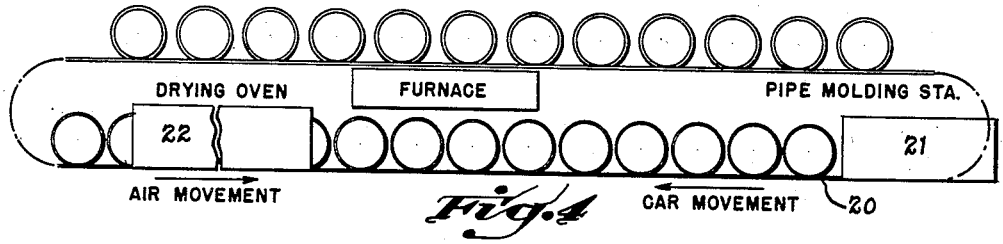
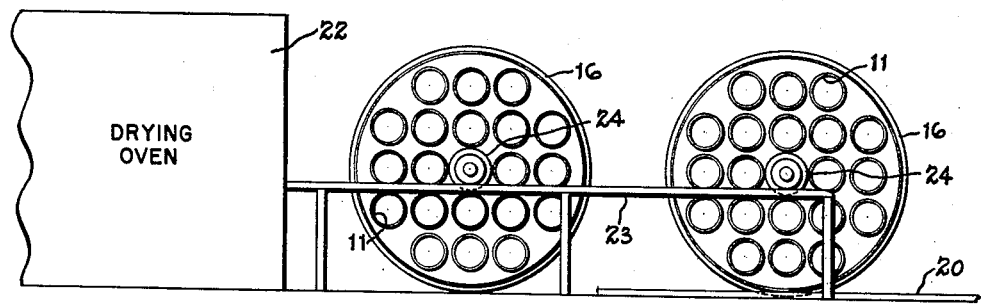
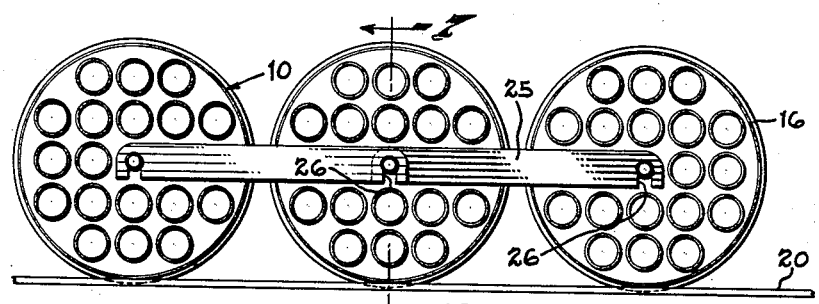
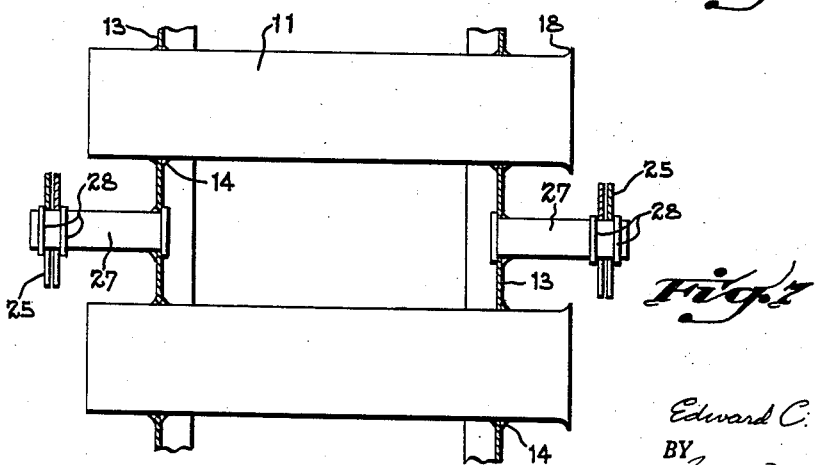
INVENTOR.
Edward C. Milliken
BY
Wood, Herron & Evans,
Attorneys.

Patented July 6, 1954

2,682,696

UNITED STATES PATENT OFFICE 2,682,696

METHOD FOR DRYING CLAY PIPE

Edward C. Milliken, Bowerston, Ohio, assignor to The Bowerston Shale Company, Bowerston, Ohio, a corporation of Ohio Application August 28, 1951, Serial No. 244,073

1 Claim. (Cl. 25—156)

This invention relates to a machine for drying clay pipe between the molding and firing operations.

Ordinarily, in manufacturing clay pipe such as sewer pipe, it is necessary to stand the individual pieces of pipe on end for a period of substantially 48 hours in order to drive the moisture used for plasticizing the clay in the molding operation from the molded pipe to a degree sufficient to permit firing without cracking. In a large sewer pipe factory, the drying of the pipe between the molding and firing is a nuisance operation which consumes appreciable floor space and involves substantial labor cost. The molding machines must be unloaded and the pipe conveyed from them to the storage space. After 48 hours, the pipe again must be transported to the mouth of the furnace or kiln in which it is to be fired, and then loaded into the furnace. Thus, one loading and one unloading operation are essential for getting the pipe to the place of storage and a second pair of loading and unloading operations necessary for getting the pipe from the place of storage into the furnace. Furthermore, a certain percentage of loss results from the drying operation as now conducted, because the pipe tends to bend or curl toward the side on which the air circulation is greater if the air circulation over the pipes being dried is not sufficiently even.

It is the object of this invention to provide a machine for conveying and drying pipe which eliminates both the conventional prolonged storage and also one of the two loading and unloading operations which are now necessarily incidental to the prolonged storage.

In its simplest form, which is illustrated in the drawings, the device of this invention comprises a two wheel car which carries a plurality of open ended perforated pipe drying sleeves or tubes between its wheels which are mounted with their inner faces opposing as if upon a single axle. While an axle may be used if desired, the function of wheel alignment and attachment may be performed by the sleeves alone. The freshly molded clay pipes are loaded into the car, one into each sleeve, at the conclusion of the molding operation. These sleeves are disposed symmetrically between the wheels in relation to their common axis of rotation so that the car may be easily pushed or pulled and is in balance in all positions. The perforated sleeves are slightly larger in diameter than the diameter of the pipes which are inserted in them so that as the two wheel car rotates, each piece of pipe also rotates within its sleeve.

This car is utilized for conveying the pipe all the way from the output end of the pipe molder to the input end of the furnace or kiln, and for drying the pipe en route. At a point intermediate these two stations, the cars are slowly passed through a room, chamber or tunnel which is air conditioned to accelerate the drying out of the pipes. In contrast with the normal 48 hours' drying time, the job can be done successfully in the much shorter period, such as two hours, provided a flow of air of proper temperature and relative humidity and velocity is employed, and provided the exposure of each part of each pipe to the air stream is substantially uniform. If the exposure is less than substantially uniform, then the pipe will tend to curl or bend.

The rotation of each piece of pipe within the sleeve which houses it, not only tends to give each part of each pipe uniform exposure to the drying air, but also eliminates all tendency of the pipe to sag. Ordinarily, if a freshly molded pipe is permitted to rest in a horizontal position, as distinguished from being stood on end, then the pipe, still being partially plastic, tends to sag to an oval or elliptical form, as distinguished from a circular form. If, however, the pipe is rotated so that its weight does not rest for too long on any one axial line of circumference, then the sagging is not only eliminated, but the pipe tends to be actually rounded to a cylinder by its rolling within the sleeve, even if the pipe is less than perfect at the start.

In using the car to convey the pipe from the molder to the furnace, the car may be advanced steadily and slowly, or intermittently, provided the period of rest is not too great at any one time prior to sufficient drying to reduce plasticity, or the car may be advanced at a speed which varies to fit the operating cycle.

The cars of this invention may conveniently pass through a tunnel through which the circulation of air may be in any desired direction. However, due to the circumstance that the tubes or sleeves are perforated, it is not essential to pass the air through the pipes axially. In fact, it is preferred that the air pass through the tunnel longitudinally, with the blast or draft of drying air and cars moving in opposite or countercurrent directions.

This type of exposure of the pipe to the air blast, that is, a partial exposure of the outer circumference, is the exact type of exposure which has been found to produce defective pipe in the ordinary drying room operations. It is common knowledge that if there is a draft in a drying room, such as may be occasioned by an open door or window at one side thereof, then the pipe which is exposed to this draft tends to curl due to differential shrinkage between different arcs of circumference of the pipe. Although this type of exposure is used in the present method or machine, the pipe rotates within its sleeve as the car advances, whereby the entire circumference of the pipe is progressively exposed and no differential shrinkage remains as an end result.

More particularly, the pipe, being smaller than the sleeve and resting upon the bottom, presents a limited arc of circumference to the column of drying air. The air enters the sleeve through the perforations in it, impinges against the pipe, and flows around the circumference of the pipe a distance sufficient to escape through the perforations of the sleeve which are less subjected to the pressure of the air blast. Preferably, the number and size of the perforations are sufficient to baffle the air blast or draft only partially, whereby only a part of the air is deflected sidewise.

Since each piece of pipe rotates within the sleeve which houses it in response to forward motion of the car, each piece of pipe rotates continuously in the same direction as the wheels of the car, and consequently, is continuously and progressively supported by circumferential surface which has been freshly dried by the air blast.

The tunnel should be long enough to accommodate a substantial number of cars at any one time; the result of which is that any individual piece of pipe in any individually perforated sleeve, occupies at one time or another every possible position in relation to the stream of drying air, whereby each piece of pipe is subjected to the same amount of drying as each other piece of pipe, and the engagement of the stream of drying air with the outer surface of each individual piece of pipe dries all 360° of the pipe wall uniformly. In order to insure this effect, the tunnel should be sufficiently long to permit several revolutions of each car within the tunnel.

In a tunnel of any length, it is difficult, if not impossible, to maintain uniform temperature between the top half of the tunnel and the bottom half of the tunnel. However, in the practice of the present invention, such unevenness of temperature as cannot be controlled is no disadvantage, because each piece of pipe, rotating as it does about the axis of revolution of the wheels of the car, is being dried at a continuously changing elevation, so that each piece of pipe is inherently exposed successively to different temperature and draft conditions within the tunnel, whereby drying conditions and exposures are averaged and it is unnecessary to "over dry" some individual pieces of pipe in order to insure sufficient drying for other individual pieces of pipe. Various air blasts or air conditioned chambers may be used instead of the tunnel, but the use of the tunnel is the simplest way of obtaining the requisite drying in the shortest period of time.

Quite obviously, the exact layout of this system of conveying and drying pipe depends upon the architecture, design and dimensions of the plant in which the system is installed. Ordinarily, the pipe molder and the furnace are some distance apart or even in separate buildings because of the necessity for substantial drying acreage in between them. Depending upon the conditions of the plant where the system is installed, the wheels of each car may be provided with tires which are suitable for the system. For instance, the car wheels may be provided with pneumatic tires and pushed by hand or provided with stub axles and propelled by an endless belt or chain which is axle high, or both. If rapid rotation is desired, small wheels may be put on the axle stubs and the cars advanced along an elevated track. For most purposes, however, it is believed to be better to use a track which rests directly upon the ground and to provide the wheels of the car with flanged metal tires so that the car runs between the track. The tires and wheels may, of course, be integral, and since the cars do not move at any substantial rate of speed, the flanges may be of sufficient width to maintain the alignment of wheels on the track without undue binding or friction.

The track may provide a complete circuit whereby the car passes from the unloading station of the molder to the drying tunnel, to the loading station of the furnace, then back to the molder. The cars may be pushed by hand or by mechanical means, or may be permitted to roll slowly by gravity. For any installation of the system, specific features must be incorporated to adapt the system to the needs of the particular plant. Whenever desired, the drier cars may be joined together to operate in tandem by means of removable bars which may be attached to the ends of the stub axles of any two or more cars.

In the accompanying drawings:

Figure 1 is a side elevation of the car of this invention.

Figure 2 is an end elevation.

Figure 3 is a sectional view taken on line 3—3 of Figure 1.

Figure 4 is a diagrammatic view illustrating a typical plant arrangement.

Figure 5 is a diagrammatic side elevational view showing a modified track arrangement.

Figure 6 is a diagrammatic side elevational view showing three cars linked together in tandem.

Figure 7 is a cross sectional view taken on line 7—7 of Figure 6.

From the point of view of method, the pipe manufactured by means of this invention is an improvement over pipe manufactured by ordinary methods in two respects. The first is that, as an incident to conveyance between the molder and the furnace, the pipe is rolled on its circumference to insure a truely circular cross section. This is accomplished by moving the axis of the individual piece of pipe on a path which is cycloidal while at the same time rotating the pipe on its axis. In the second place, the subjection of the pipe to a countercurrent blast or draft of drying air, while being rotated and moved upon the cycloidal path indicated, results in evenness of the drying which insures the maintenance of circular cross section.

More particularly, each car comprises two wheels 10—10 which are connected together by tubes or sleeves 11 perforated as at 12. In Figure 2 of the drawings, only one of the sleeves is shown as being perforated, however, it will be understood that all the sleeves in a car are pierced. Each wheel, in the present instance, is made from a circular wall or web 13 of sheet metal which has a plurality of round holes cut in it to accommodate the perforated sleeves. Preferably, the sleeves are welded circumferentially to the web as shown at 14 in Figures 3 and 7. The outer edge of each web is turned over to provide a peripheral flange 15 which seats a metal tire 16. The tires may be made from angle iron material formed in a circle. This construction provides a radial flange 17 at the inner edge of each tire, whereby the car may be moved along a track of metal, masonry, wood or any other desired material.

The sleeves themselves are symmetrically disposed in relation to the axis of rotation of the wheels, whereby the unit is at all times in balance. In addition, the sleeves may have flared ends 18 to facilitate loading. In order to insure a true circular cross section for the pipe, the sleeves are slightly larger in diameter than the pipe so that the pieces of pipe roll in the sleeves as the car rolls, this relationship being shown in Figures 1 and 3.

Although the drawings illustrate the simplest construction, it will be understood that the structure may be further rigidified by an axle extending between the wheels or may be supplemented by stub axles extending to the outside of each wheel, or both. In any event, the wheels joined by the tubes are positioned in relation to each other as if upon opposite ends of an ordinary axle.

In Figure 4, which shows schematically a typical plant arrangement, a track 20 extends from the delivery end of a pipe moulding station 21 to a tunnel drying oven 22 through which it passes. Air may be blown through the tunnel by means of a conventional blower, not shown, in the direction counter to the indicated car movement. It is to be understood that the air supplied by the blower may be heated or dehydrated to whatever extent local conditions may require. If desired, the track may be arranged in the form of a closed circuit extending from the tunnel 22 to the delivery end of a furnace (not shown), and from there, back to the delivery end of the pipe molding station 21.

No mechanism for advancing the cars is disclosed for the reason that any desired combination of operations performed by manual labor and by mechanical implements may be employed. If desired, the track may be gently sloped all the way from the molder to the furnace, and the motion of the cars retarded intermittently by means of blocks manually applied to the tracks. The cars may be pushed up the incline from the furnace to the molder manually. Alternatively, as much automatic equipment as desired may be utilized to implement or displace the manual labor.

In order to provide an increased rate of rotation for the pipes in the cars, an elevated track such as the one shown at 23 in Figure 5 may be employed, this track accommodating small diameter car wheels 24 which are mounted upon stub axles. Thus, in the instance shown, the cars roll on the tires 16 from the pipe molding station to a point near the drying oven where car wheels 24 engage the elevated track 23. It will be appreciated that elevated tracks may be utilized throughout the circuit or in any portion of the circuit where greater rotative speed than that provided by rolling the cars upon tires 16 is desired.

Figures 6 and 7 illustrate a modification in which the cars are linked together in a train by means of bars such as those shown at 25. These bars may have slots 26 at their respective ends which engage over stub axles 27—27 extending outwardly from the respective sides of the wheels upon their axis of rotation. Spaced collars 28—28 may be used for seating the slotted ends of bars 25 as illustrated in Figure 7.

By means of these cars and this system, the problem of conveying pipe from the molder to the furnace is substantially simplified and the prolonged drying of the pipe without all of the attendant space consumption and pipe handling complications is eliminated. Additionally, the quality of the pipe which is rolled during drying in the perforated sleeve is more uniform and better than pipe which has been dried by prolonged standing on end.

Having described my invention, I claim:

The method of conveying freshly molded plastic clay pipe from the molder to the furnace in which the pipe is to be fired and drying the pipe sufficiently en route to permit firing, said method comprising supporting the freshly molded pipe in a horizontal position by means of a circumferential support which has a diameter slightly exceeding that of the pipe, rolling the pipe in the circumferential support by advancing the circumferential support in a cycloidal path from the molder to the furnace, and blowing a stream of drying air in a direction countercurrent to said cycloidal path over a distance greater than one cycle of said path.

References Cited in the file of this patent

UNITED STATES PATENTS

| Number | Name | Date |
|---|---|---|
| 1,458,393 | Chapman | June 12, 1923 |
| 1,498,774 | Baldwin | June 24, 1924 |
| 1,822,158 | Majer | Sept. 8, 1931 |
| 1,933,051 | Fanta | Oct. 31, 1933 |
| 2,039,129 | Vance et al. | Apr. 28, 1936 |
| 2,219,166 | Schaefer | Oct. 22, 1940 |
| 2,554,705 | Jewell | May 29, 1951 |
| 2,618,075 | Everhart | Nov. 18, 1952 |